United States Patent
Habusha et al.

(10) Patent No.: US 10,402,252 B1
(45) Date of Patent: Sep. 3, 2019

(54) ALTERNATIVE EVENT REPORTING FOR PERIPHERAL DEVICES

(71) Applicant: Amazon Technologies, Inc., Seattle, WA (US)

(72) Inventors: Adi Habusha, Moshav Alonei Abba (IL); Eric Jason Brandwine, Haymarket, VA (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 15/085,963

(22) Filed: Mar. 30, 2016

(51) Int. Cl.
    *G06F 11/00*      (2006.01)
    *G06F 11/07*      (2006.01)
    *G06F 11/30*      (2006.01)
    *G06F 11/22*      (2006.01)

(52) U.S. Cl.
    CPC ........ *G06F 11/0772* (2013.01); *G06F 11/221* (2013.01); *G06F 11/2221* (2013.01); *G06F 11/3006* (2013.01); *G06F 11/3027* (2013.01); *G06F 11/3041* (2013.01)

(58) Field of Classification Search
    CPC .................................................. G06F 11/0772
    USPC .................................... 714/43, 44, 45, 48, 56
    See application file for complete search history.

(56) References Cited

U.S. PATENT DOCUMENTS

| | | | |
|---|---|---|---|
| 6,233,667 B1 * | 5/2001 | Shaylor | G06F 12/0223 711/200 |
| 6,311,296 B1 | 10/2001 | Congdon | |
| 7,206,974 B2 | 4/2007 | Kozlov et al. | |
| 7,418,618 B2 | 8/2008 | Huang | |
| 7,730,361 B2 | 6/2010 | Das et al. | |
| 8,510,592 B1 | 8/2013 | Chan | |
| 2006/0256770 A1* | 11/2006 | Caci | H04L 41/18 370/352 |
| 2006/0271718 A1 | 11/2006 | DiPlacido, Jr. et al. | |
| 2013/0060987 A1* | 3/2013 | Bolen | G06F 13/00 710/316 |
| 2013/0155074 A1* | 6/2013 | Rubin | G06T 1/20 345/501 |
| 2014/0281070 A1* | 9/2014 | Natu | G06F 12/06 710/105 |
| 2016/0210258 A1* | 7/2016 | Shen | G06F 13/4027 |
| 2016/0359890 A1* | 12/2016 | Deen | H04L 63/1425 |
| 2016/0378674 A1* | 12/2016 | Cheng | G06F 12/1009 711/206 |
| 2017/0052916 A1* | 2/2017 | Kollu | G06F 13/4022 |

* cited by examiner

*Primary Examiner* — Dieu Minh T Le

(74) *Attorney, Agent, or Firm* — Robert C. Kowert; Meyertons, Hood, Kivlin, Kowert & Goetzel, P.C.

(57) ABSTRACT

A peripheral device may implement alternative reporting of errors and other events detected at the peripheral device. A peripheral device may monitor the operations of the peripheral device for reporting events. Upon detecting a reporting event, a notification of the reporting event may be generated and sent to a remote data store. The remote data store may store the reporting event and evaluate the reporting event for a responsive action that may be performed. If a responsive action is determined, then the remote data store may direct the performance of the responsive action. The remote data store may provide access to stored reporting events for a peripheral device.

21 Claims, 8 Drawing Sheets

ALTERNATIVE EVENT REPORTING FOR PERIPHERAL DEVICES

BACKGROUND

The demand for computing services continues to drive development to increase the capabilities of hardware resources to accommodate the demand. However replacing entire sets of hardware resources in order to acquire the latest technological capabilities (e.g., replacing entire servers or racks of servers) can be very costly. Peripheral devices provide a cost effect way to expand the capabilities of fixed computing resources. For instance, without peripheral devices, a server would be limited to the built in capabilities on the server motherboard (e.g., built-in memory, processors, and other computing resources). By installing peripheral devices in expansion interfaces (e.g., PCI or PCIe slots), the capability of the server may be increased. A graphics card, network interface card, additional memory, or device controllers or interfaces for storage, for example, may be added to enhance the functionality of the server. Moreover, newer peripheral devices with greater performance capabilities may be more cost effective to install and replace existing peripheral devices. Thus, peripheral devices are key to satisfying computing service demand by providing cost effective upgrades to existing hardware resources.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may implement alternative event reporting for peripheral devices. Computing resources, such as various kinds of servers, computers, and other computing devices may utilize peripheral devices to expand the capabilities of the computing resources beyond that which the underlying hardware of the computing resources can provide. Thus, additional graphics processing capabilities, network processing capabilities, storage processing capabilities, or other computing capabilities may be changed as result of installing peripheral devices. In order to provide easy installation and interchangeability, various standard expansion bus protocols may be utilized to offer a common interface via which different peripheral devices can installed. However such standardized interfaces typically limit the capability of reporting various events or conditions occurring at the peripheral device that may be specific to the peripheral device. Moreover, as the interface provides the communication link between the peripheral device and the host computing resources, failures of the host interface may result in unreported events that if recorded may be beneficial for troubleshooting problems and preventing certain failure conditions.

Figure 1:
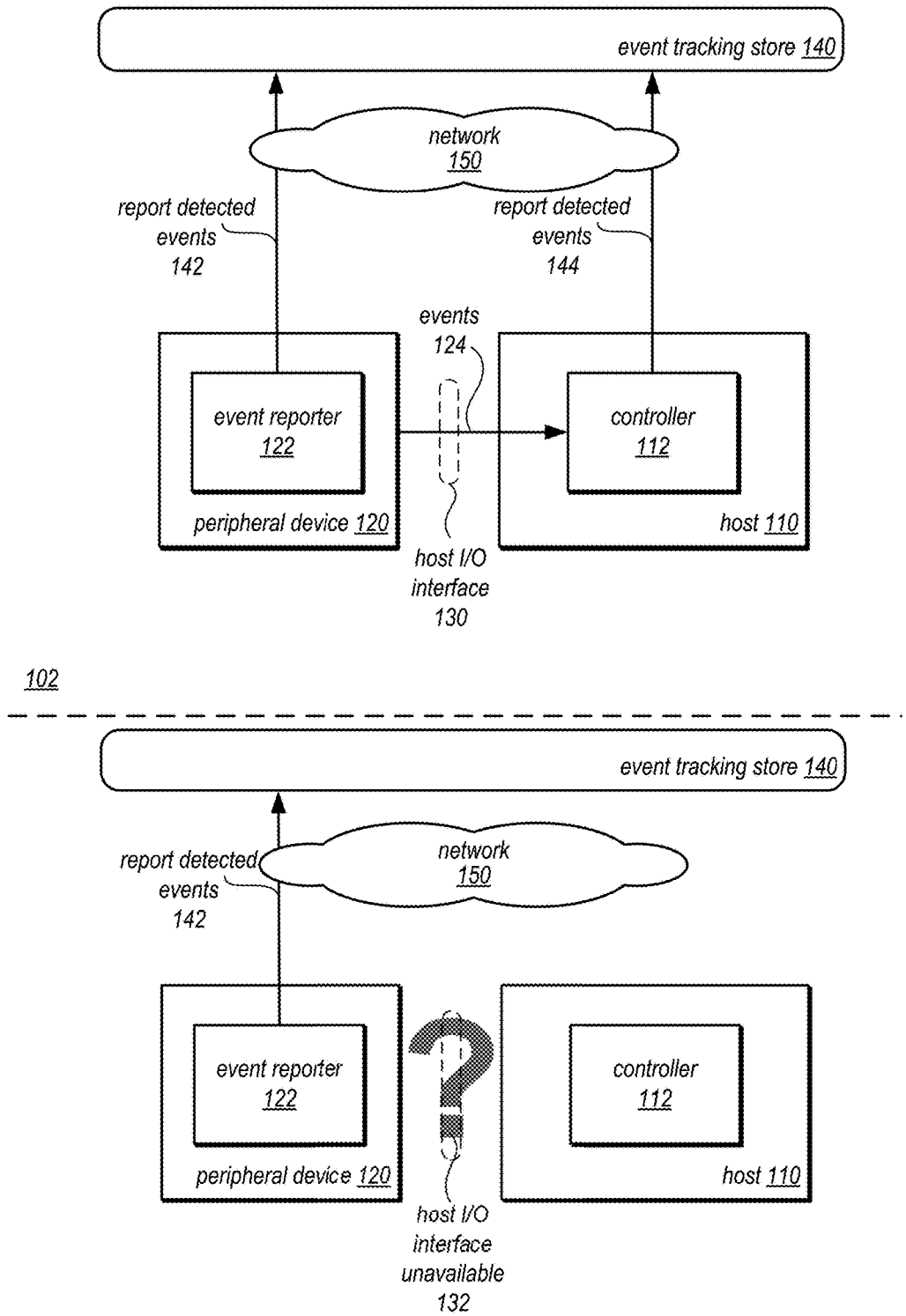
FIG. 1 illustrates a series of logical block diagrams that demonstrate alternative event reporting for peripheral devices, according to some embodiments.

FIG. 1 illustrates a series of logical block diagrams that demonstrate alternative event reporting for peripheral devices, according to some embodiments. In scene 102, host 110 may be a computing device, such as computing system 1000 in FIG. 8 below, that has a peripheral device 120 connected to host 110 via host I/O interface 130. Peripheral device 120 may be managed by controller 112 on behalf of host 110 and report various events 124 (e.g., errors and other interface specified information) via host I/O interface 130 (in addition to data transmitted between peripheral device 120 and host 110 in the course of performing operations at peripheral device 120 that expand the capabilities of host 110). Controller 110 may, in some embodiments, report detected events 124 received via interface 130 to event tracking store 140 over network 150. Additionally, peripheral device 120 may implement an event reporter 122 to detect and report detected events 142 directly to event tracking store 140 via network 150, without any guidance, instruction, direction or utilization of host 110, in some embodiments. In this way, peripheral device 120 may monitor operations performed at peripheral device 120 independently from host 110, bypassing host I/O interface 130.

As noted above, many different types of peripheral devices may provide different additional capabilities to a host. Various configurations of hardware and/or software components, (e.g., one or more general or specialized processors (e.g., multicore processor(s)), a host interface bus, a memory, a network interface, and an internal I/O interface) may be implemented as part of peripheral device 120 to perform different operations for host 110. In some embodiments, the peripheral device 120 may provide additional network processing capabilities to host 110. For example, peripheral device 120 may process network traffic (e.g., packet flows) between computing resources maintained at host 110 and clients of the computing resources (such as the various resources instances offered by a provider network as described below with regard to FIG. 2). A peripheral component interconnect express (PCIe) interface 130 may be implemented in some embodiments so that network packets received at the peripheral device may be processed and sent to appropriate resources on host 110.

In addition reporting events which are specified by host I/O interface 130, event reporter 122 may report custom events (e.g., based on other operational data, metrics, error conditions, or health information determined for peripheral device 120). For example, if host I/O interface 130 is PCIe, then event reporter 122 may detect and report events that are different from those specified by PCIe protocol. In this way, event report may provide a rich set of reporting events that are specific to the peripheral device, in addition to those commonly specified errors and other reporting events for interface 120. In order to directly report detect events 142 over network 150, peripheral device may implement one or more network ports or interfaces connected to the provider network via wired or wireless links that may send detected events 142 to the event tracking store. Event tracking store 140 may be a simple data store that receives and stores detected events (e.g., in a log) for peripheral device 120. In some embodiments, event tracking store 140 may analyze reported events and direct the performance of various responsive actions, as discussed below with regard to FIGS. 2, 5, and 7.

In addition to providing the opportunity to gather greater amounts of information particular to peripheral devices, alternative event reporting may prevent the loss of detected events in certain failures for scenarios. For instance, as illustrated in scene 104, if host I/O interface 132 becomes unavailable due to failure, events detected at peripheral device 120 may still be reported 142 to event tracking store 140. As it is common when such failures occur to reboot the host and connected peripheral devices, events may be reported when they are detected so that no data loss occurs as result of a reboot of peripheral device 120.

Please note that previous descriptions are not intended to be limiting, but are merely provided as an example of alternative event reporting for peripheral devices. Various types of peripheral devices, hosts systems, and event tracking stores may be implemented as well as different events may be reported than those given in the examples discussed above.

This specification begins with a general description of a provider network, which may implement alternative event reporting for peripheral devices utilized to provide various computing resources in the provider network, such as virtual compute instances offered via a virtual compute service. Then various examples of a resource host and peripheral device are discussed, including different components/modules, or arrangements of components/module that may be employed as part of alternative event reporting for the peripheral devices. A number of different methods and techniques to implement alternative event reporting for peripheral devices are then discussed, some of which are illustrated in accompanying flowcharts. Finally, a description of an example computing system upon which the various hosts, components, modules, systems, devices, and/or nodes may be implemented is provided. Various examples are provided throughout the specification.

Figure 2:
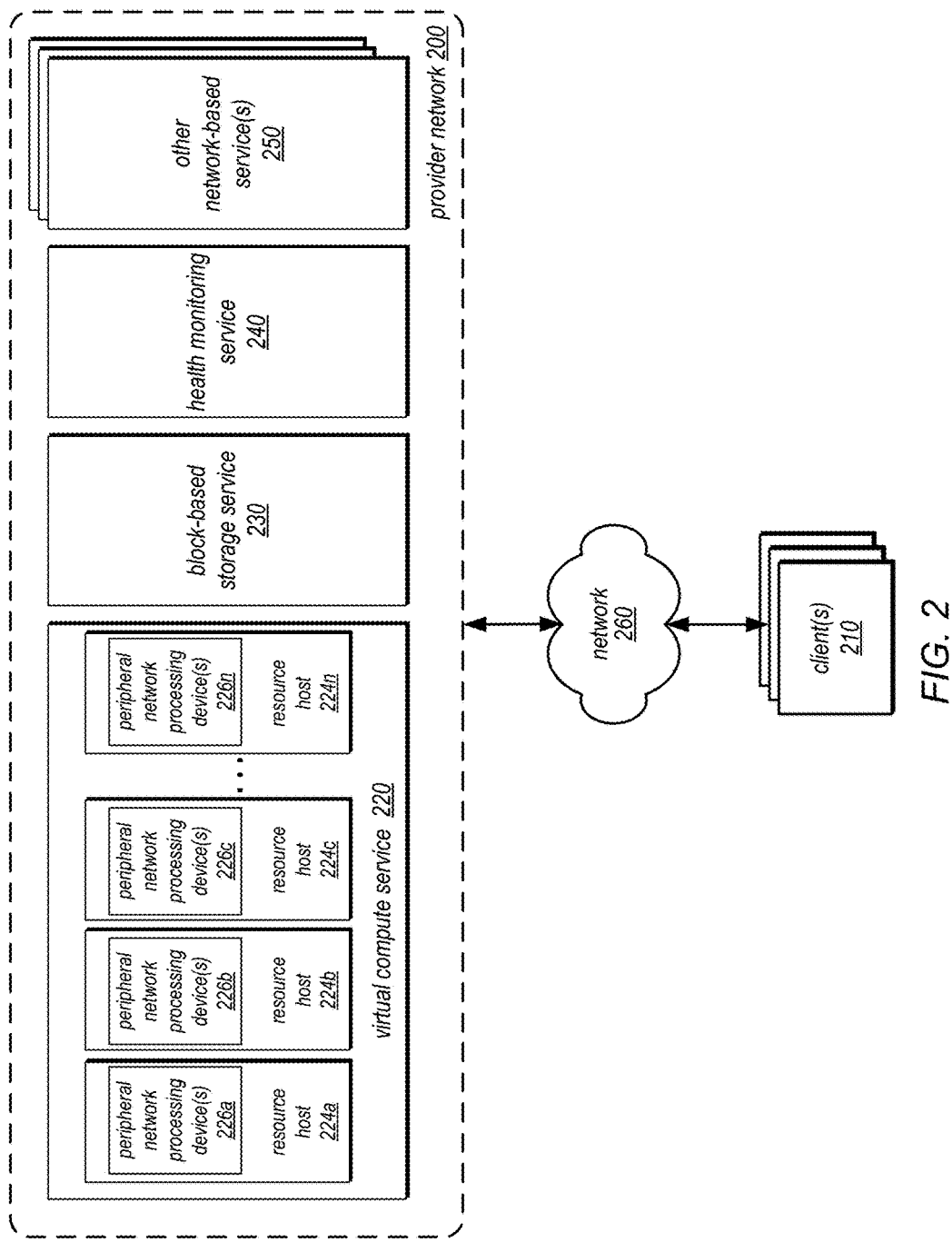
FIG. 2 is a block diagram illustrating a provider network implementing multiple network-based services including resource hosts that utilize peripheral devices that perform alternative event reporting, according to some embodiments.

FIG. 2 is a block diagram illustrating a provider network implementing multiple network-based services including resource hosts that utilize peripheral devices that perform alternative event reporting, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200. In some embodiments, provider network 200 may provide computing resources, such as virtual compute service 220, storage services, such as block-based storage service 230 and other storage services (which may include various storage types such as object/key-value based data stores or various types of database systems), a health monitoring service 240 (which may be implemented as part of a control plane for provider network 200 in order to monitor the health of resources hosted by the provider network) and/or any other type of network-based services 250. Clients 210 may access these various services offered by provider network 200 via network 260. Likewise network-based services may themselves communicate and/or make use of one another to provide different services. For example, computing resources offered to clients 210 in units called "instances," such as virtual or physical compute instances or storage instances, may make use of particular data volumes hosted by block-based storage service 230, providing virtual block storage for the compute instances.

As noted above, virtual compute service 220 may offer various compute instances to clients 210. Virtual compute service 220 may implement various resource hosts 224 (e.g., servers or other computing devices such as described below with regard to FIG. 8) which provide various physical computing resources which virtual compute instances utilize to operate. As illustrated in FIG. 2, one or more peripheral network processing devices(s) 226 may be implemented which perform various functions to facilitate network communication between resource hosts and other resources within provider network 200 or external destinations, such as clients 210. Peripheral network processing device(s) may be connected to resource hosts via an expansion bus or other interface.

Resource hosts may host one or multiple types of virtual compute instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of virtual compute service 230 in different embodiments, including special purpose computer servers, storage devices, network devices and the like. In some embodiments instance clients 210 or other any other user may be configured (and/or authorized) to direct network traffic to a compute instance. In various embodiments, compute instances may attach or map to one or more data volumes provided by block-based storage service 230 in order to obtain persistent block-based storage for performing various operations.

Compute instances may operate or implement a variety of different platforms, such as application server instances, Java™ virtual machines (JVMs), special-purpose operating systems, platforms that support various interpreted or compiled programming languages such as Ruby, Perl, Python, C, C++ and the like, or high-performance computing platforms) suitable for performing client applications, without for example requiring the client 210 to access an instance. In some embodiments, compute instances have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, such as a particular number of virtual CPU cores, memory, cache, storage, as well as any other performance characteristic. Configurations of compute instances may also include their location, in a particular data center, availability zone, geographic, location, etc., and (in the case of reserved compute instances) reservation term length.

In various embodiments, provider network 200 may also implement block-based storage service 230 for performing storage operations. Block-based storage service 230 is a storage system, composed of a pool of multiple independent resource hosts similar to resources hosts 224 (e.g., server block data storage systems), which provide block level storage for storing one or more sets of data volumes data volume(s). Data volumes may be mapped to particular clients (e.g., a virtual compute instance of virtual compute service 220), providing virtual block-based storage (e.g., hard disk storage or other persistent storage) as a contiguous set of logical blocks. In some embodiments, a data volume may be divided up into multiple data chunks or partitions (including one or more data blocks) for performing other block storage operations, such as snapshot operations or replication operations.

Provider network 200 may implement health monitoring service 240 in order to tracking error events, health indicators, and other status information of the various resource hosts in different services (e.g., resource hosts 224 in virtual compute service 220), peripheral devices utilized by the hosts (e.g., peripheral network processing devices 226), or the resources themselves (e.g., performance metrics for virtual compute instances, data volumes, data objects, etc. hosted at different services of provider network 200). In various embodiments, health monitoring service 240 may receive reports of events detected at peripheral devices, such as peripheral network processing devices 226 directly from the peripheral devices, without receiving any communications from the resource host at which the peripheral device is installed. In this way, any host interface failures between peripheral devices and resource hosts that occur will not prevent errors and other reporting events detected at the peripheral devices from being received at health monitoring service 240.

Clients 210 may encompass any type of client configurable to submit requests to network provider 200. For example, a given client 210 may include a suitable version of a web browser, or may include a plug-in module or other type of code module configured to execute as an extension to or within an execution environment provided by a web browser. Alternatively, a client 210 may encompass an application such as a database application (or user interface thereof), a media application, an office application or any other application that may make use of compute instances, a data volume 226, or other network-based service in provider network 200 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients 210 may be configured to generate network-based services requests according to a Representational State Transfer (REST)-style network-based services architecture, a document- or message-based network-based services architecture, or another suitable network-based services architecture. In some embodiments, a client 210 (e.g., a computational client) may be configured to provide access to a compute instance or data volume 226 in a manner that is transparent to applications implement on the client 210 utilizing computational resources provided by the compute instance or block storage provided by the data volume 226.

Clients 210 may convey network-based services requests to provider network 200 via external network 260. In various embodiments, external network 260 may encompass any suitable combination of networking hardware and protocols necessary to establish network-based communications between clients 210 and provider network 200. For example, a network 260 may generally encompass the various telecommunications networks and service providers that collectively implement the Internet. A network 260 may also include private networks such as local area networks (LANs) or wide area networks (WANs) as well as public or private wireless networks. For example, both a given client 210 and provider network 200 may be respectively provisioned within enterprises having their own internal networks. In such an embodiment, a network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and provider network 200. It is noted that in some embodiments, clients 210 may communicate with provider network 200 using a private network rather than the public Internet.

Figure 3:
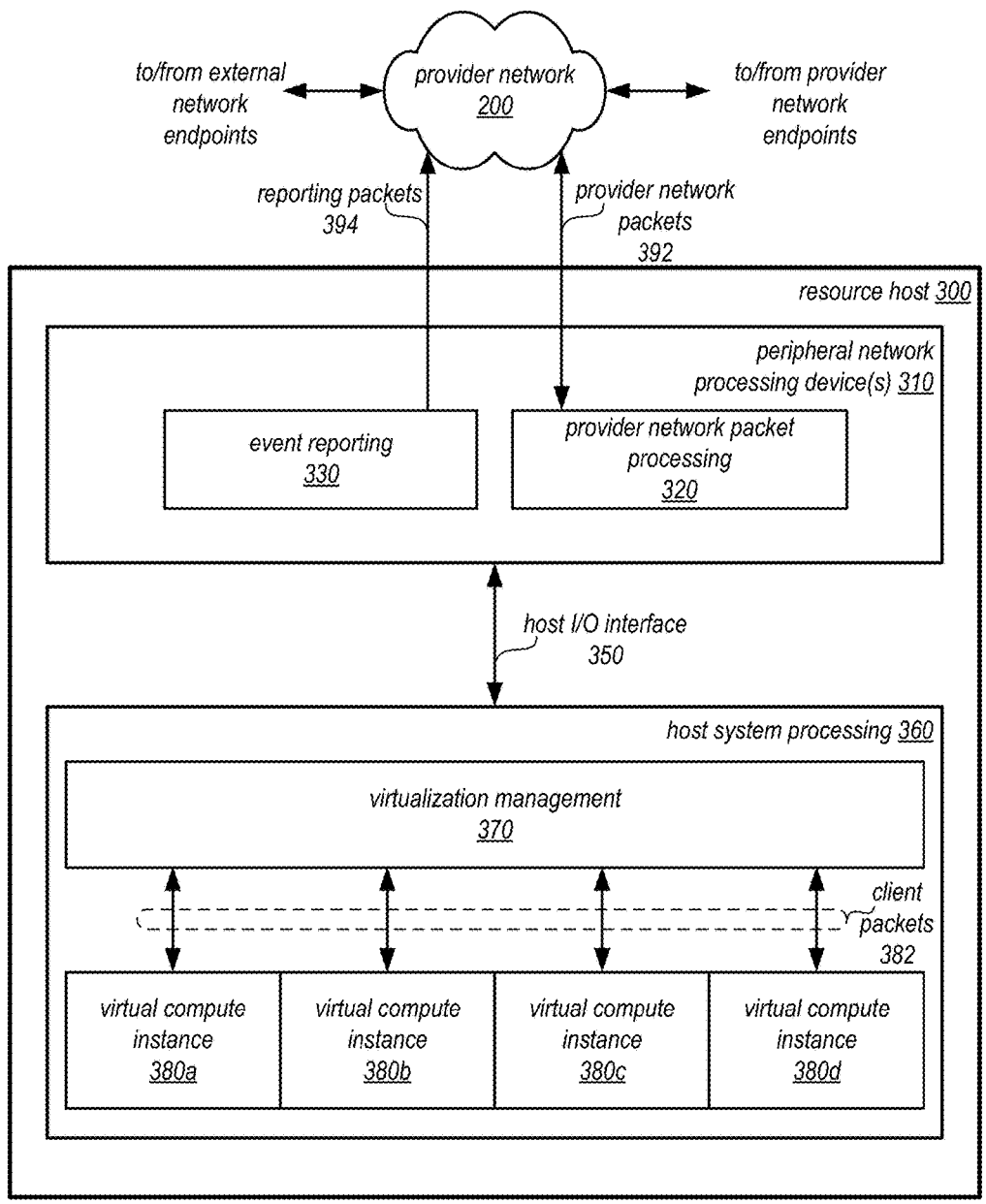
FIG. 3 is a logical block diagram illustrating a resource host that implements a peripheral network processing device that implements alternative event reporting, according to some embodiments.

FIG. 3 is a logical block diagram illustrating a resource host that implements peripheral network processing device that implements alternative event reporting, according to some embodiments. Resource host 300 illustrates peripheral network processing device(s) 310 which process packets for virtual compute instances 380 at a resource host 300 in a provider network environment, according to some embodiments. As FIG. 3 illustrates, in at least some embodiments of a provider network 200, at least some of the computing resources provided to clients of the provider network 200 may be virtualized computing resources implemented on multi-tenant hardware that is shared with other client(s) and/or on hardware dedicated to the particular client (e.g., virtual compute instance 380a may be hosted for a different client than virtual compute instances 380b, 380c and 380d).

Figure 8:
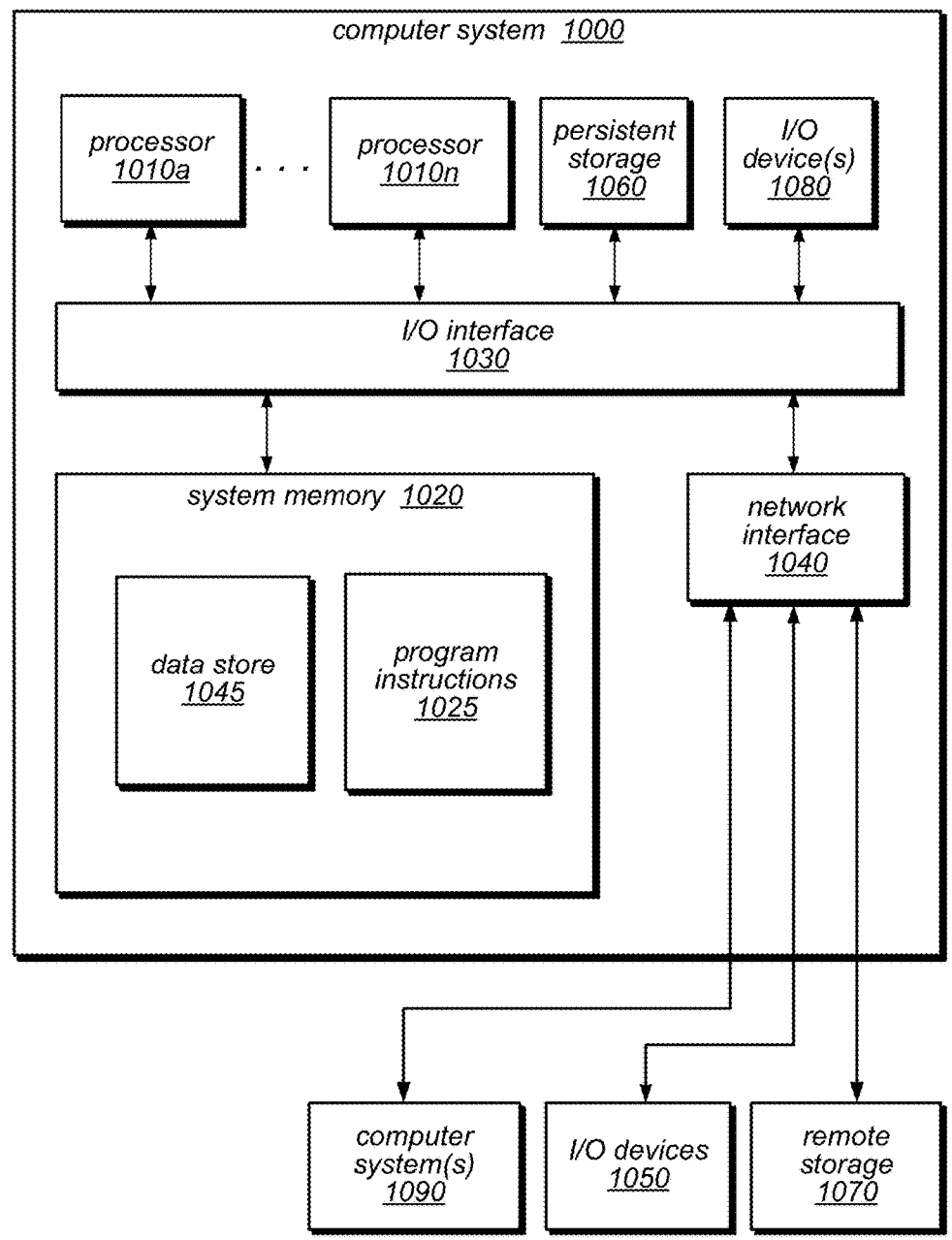
FIG. 8 is a block diagram illustrating an example computing system, according to some embodiments.

At least some of the virtual compute instances 380 on the provider network 200 may be implemented according to hardware virtualization technology that enables multiple operating systems to run concurrently on a host computer, such as resource host 300, i.e. as virtual machines (VMs) on the host. A hypervisor, or virtual machine monitor (VMM) 370, on the host 300 presents the virtual compute instances 380 on the respective host 300 with a virtual platform and monitors the execution of the client resource instances 380 on the host 300. Each virtual compute instance 380 may be provided with one or more network addresses; the VMM 370 may be aware of the network addresses of the virtual compute instances 380 on the host 300, and may communicate with the peripheral network processing device(s) 310 on the host 300 to route incoming client packets 382 to and outgoing client packets 382 from the virtual compute instances 380. As shown in FIG. 3, the VMM 370 and client resource instances 380 may be implemented on and executed by host device processing 360 components of the host 300, for example processor(s) and memory implemented by the host 300. FIG. 8 is a block diagram illustrating an example computer system that may be used as a host 300 in some embodiments.

Provider network 200 may include a network substrate that includes networking devices (e.g., routers, switches, network address translators (NATs), etc.), as well as the physical connections among the devices. In at least some embodiments, the VMMs 370, peripheral network processing devices 310, or other devices or processes on the network substrate may use encapsulation protocol technology to encapsulate and route network packets (e.g., client packets 382) over the network substrate between virtual compute instances 380 on different hosts within the provider network 200, or to endpoints external to the provider network 200 via network devices such as edge routers. The encapsulation protocol technology may be used on the network substrate to route encapsulated packets (also referred to as network substrate packets or provider network packets 392) between endpoints on the network substrate via overlay network paths or routes. The encapsulation protocol technology may be viewed as providing a virtual network topology overlaid on the network substrate. In at least some embodiments, the encapsulation protocol technology may include a mapping service that maintains a mapping directory that maps network overlay addresses (e.g., public internet protocol (IP) addresses) to substrate network addresses (e.g., private IP addresses) and that may be accessed by various processes on the provider network 200 for routing packets between endpoints on the network substrate.

In at least some embodiments, host 300 may include or may be coupled to one or more peripheral network processing device(s) 310 that process network traffic (e.g., packet flows) between the virtual compute instances 380 on the host 300 and the provider network 200. Peripheral network processing device(s) 310 may connect to and communicate with host system processing 360 according host I/O interface 350 (which may be any kind of expansion bus standard, such as peripheral component interconnect (PCI), PCI extended (PCI-X), PCI express (PCIe), or accelerated graphics port (AGP). For example, peripheral network processing device 310 may be a network interface card with a PCIe interface plugged into a PCIe expansion slot or PCIe bus of the host 300.

A peripheral network processing device 310 may include provider network packet processing 320 functionality that may apply provider network-related functions to packets received by the device via a network connection to provider network 200. For example, the provider network packet processing 320 functionality may implement provider network encapsulation protocol technology to encapsulate client packets 382 and route the encapsulated packets (provider network packets 392) over a network substrate within the provider network 200, and to decapsulate client packets 382 targeted at the virtual compute instance(s) 380 on the host 300 and forward the decapsulated packets 382 to the target virtual compute instance(s) 380. Additionally, provider network packet processing 320 functionality may apply private network-related functions to at least some packets received by the peripheral network processing device 310. For example, provider network packet processing 320 functionality may enforce security group, access control rules, access control lists (ACLs), subnets, and/or other access control functionality for clients' private network implementations on the provider network 200.

Figure 4:
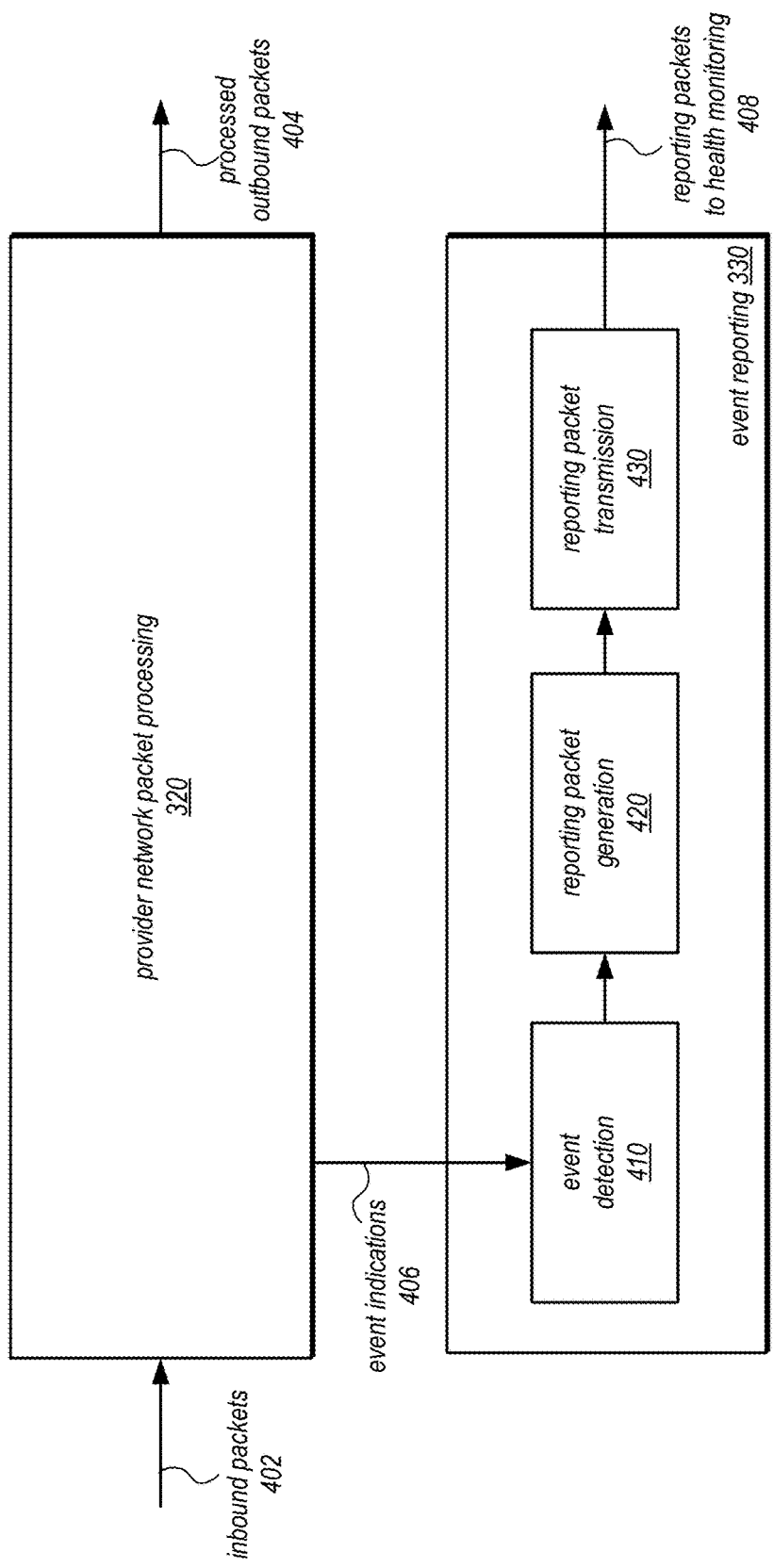
FIG. 4 is a logical block diagram of event reporting for a peripheral network processing device, according to some embodiments.

In addition to processing provider network packets 392 for virtual compute instances 380, peripheral network processing device may implement event reporting 330 functionality to detect various kinds of reporting events detected at peripheral network processing device(s) 310. Event reporting 330 may then send reporting packets 394 over a network connection to provider network 200 to a remote data store or service, such as health monitoring service 240. FIG. 4 is a logical block diagram of event reporting for a peripheral network processing device, according to some embodiments.

Peripheral network processing device(s) 310 may utilize any combination of hardware and/or software to implement provider network packet processing 320 and event reporting 330. For example, dedicated circuitry (e.g., an application specific integrated circuit (ASIC), a field programmable gate array (FPGA), a system-on-chip (SoC)) may be implemented to provide a hardware processing pipeline for inbound network packets 402 in order to produce processed outbound packets 404. Alternatively a processor executing stored instructions (e.g., firmware) may implement the provider network packet processing 320 functionality and/or event reporting functionality 330.

While provider network packet processing is operating 320, various event indications 406 may be provided to event reporting 330. For instance, error or event registers or other components may be utilized to signal particular conditions. In instances where provider network packet processing 320 is implemented as a software-based component, various interrupts, exceptions, and other error indications may be triggered as a result of various conditions detected while processing network packets. For example, custom error conditions, health metrics, and other information may be discovered while perform network packet processing and corresponding indications 406 may be provided as part of error handling or other event triggering. In some embodiments, events may be errors specified according to a host interface between the host system and the peripheral network processing device, such as PCIe, and may be provided as event indications 406 (e.g., transaction layer errors, data link errors, physical layer errors, and error classifications such as correctable or uncorrectable errors).

Event reporting 330 may implement event detection 410 to detect when reporting events have occurred. For example, based on the event indications 406, event detection 410 may apply a rule, such as threshold, or other technique for determining whether an event to report has occurred. It may be, for instance, that some event indications are ignored or not reported until other conditions are satisfied, such as other event indications are received. Event detection 410 may be a programmable component which may be updated (e.g., with different firmware or microcode) to report new and/or different events. In this way, reporting events may be customized or expanded beyond the scope of those events specified in a host interface for the peripheral network processing device. For example, event detection 410 may receive updates to include different reporting events (without the knowledge or awareness of a host system, such as host system processing 360 in FIG. 3), monitor for the different reporting events, and report the different reporting events when detected. In at least some embodiments, event reporting 330 may be implemented such that a host system or application executing thereon is unaware of the monitoring, detection, and reporting of reporting events.

Detected reporting events may be passed on to reporting packet generation 420, which may generate a network packet for transmitting a notification or indication of the reporting event. Various metadata, such as a timestamp or classification of the reporting event may be included that is useful for subsequent analysis of the reporting event. In some embodiments, multiple notifications for different reporting events may be included in a single network packet. The generated network packet may be provided to reporting packet transmission 430 to be sent to health monitoring 408 or other remote event tracking data store. In some embodiments, reporting packet transmission 430 may discover a network endpoint (e.g., an IP address) to send the reporting packet. In some embodiments, different reporting packets may be sent to different locations depending on the type of reporting event. For instance, general health information may be sent to one endpoint while error events may be sent to a different endpoint that maintains an error log.

Figure 5:
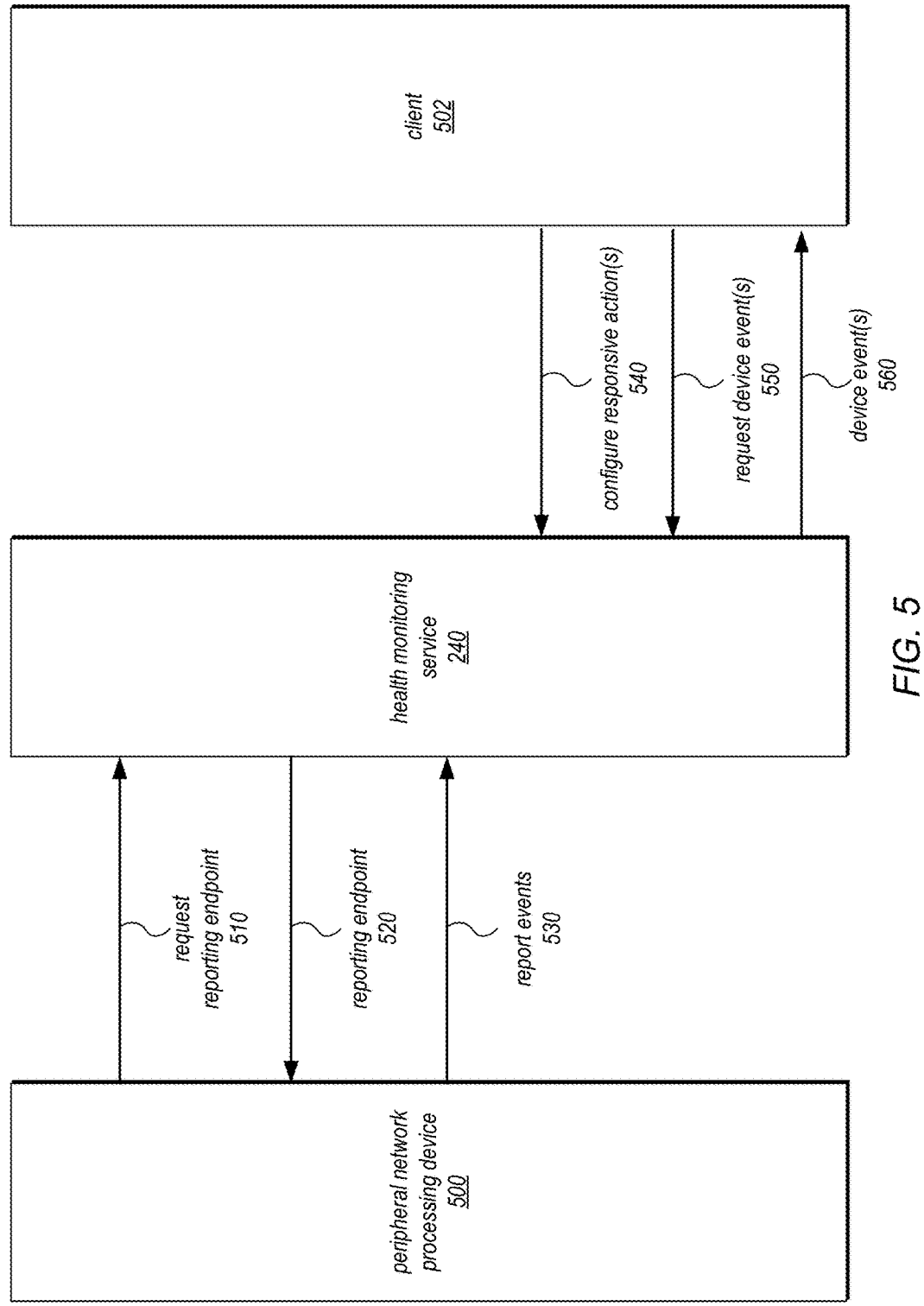
FIG. 5 illustrates interactions among a peripheral network processing device, a health monitoring service, and a client of the health monitoring service, according to some embodiments.

FIG. 5 illustrates interactions among a peripheral network processing device, health monitoring service, and client of the health monitoring service, according to some embodiments. In some embodiments, health monitoring service 240 may coordinate the reporting of events from peripheral network processing devices, evaluate, track, and store reported events, direct the performance of responsive actions, and provide events to requesting clients. A programmatic interface, such as an application programming interface, may be implemented to facilitate interactions. For instance, as indicated at 510, a request for the reporting endpoint for peripheral network processing device 500 may be received. Health monitoring service 240 may provision and configure a resource, such as compute node or server within provider network 200 to receive, process, and store, reported events. Health monitoring service 240 may return a network endpoint (e.g., IP address) to the peripheral network processing device 500 so that subsequent events 530 may be reported directly to the provisioned monitoring resources. Monitoring resources, such as the provisioned compute node or server, may direct the performance of responsive actions, in some embodiments, as discussed below with regard to FIG. 7.

As noted above, health monitoring service 240 may perform automated responsive actions, in some embodiments, based on the reporting events. Health monitoring service may provide an interface (e.g., a graphical user interface) via which authorized users may configure the responsive actions(s) 540. For instance, various thresholds, conditions, or other specified scenarios may be defined along with a corresponding action. In some embodiments, health monitoring service 240 may perform automated analysis, such as various kinds of statistical evaluations, like machine learning, to develop model for appropriate responsive actions. Additionally, health monitoring service may, in various embodiments, provide an interface to request events 540 for a particular peripheral network device (or group of devices), and display or send the device event(s) to the requesting client 502.

Figure 6:
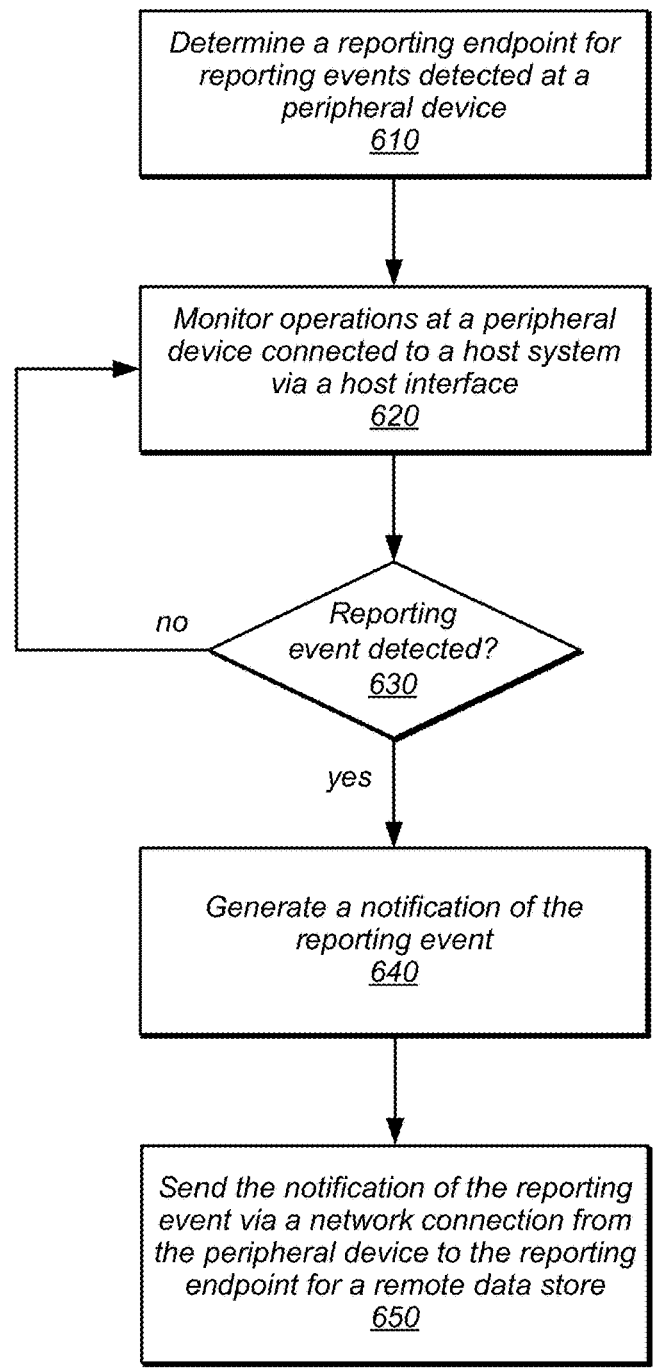
FIG. 6 is a high-level flowchart illustrating various methods and techniques for alternative event reporting for peripheral devices, according to some embodiments.

The examples of alternative event reporting for peripheral devices as discussed above with regard to FIGS. 2-5 have been given in regard to a networking peripheral device. Various other types or configurations of peripheral devices with networking capabilities to report errors may implement these techniques. Moreover, different configurations of the various modules, components, systems, and or services described above that may implement alternative event reporting for peripheral devices without relying upon a host interface between the peripheral device and a host system to report events. FIG. 6 is a high-level flowchart illustrating various methods and techniques for alternative event reporting for peripheral devices, according to some embodiments. These techniques may be implemented by peripheral network processing devices, as described above with regard to FIGS. 2-5.

As indicated at 610, a reporting endpoint for reporting events detected at a peripheral device may be determined in some embodiments. For example, the peripheral device may have pre-programmed network address or other location included in a reporting component, such as discussed above with regard to FIG. 4, which may indicate the reporting endpoint for the peripheral device. In some embodiments, the reporting endpoint may be discoverable. For example, a domain name system (DNS) implemented at a server or other mapping system or component may be generally queried by the peripheral device to identify the reporting endpoint. A service, such as health monitoring service 240 in FIGS. 2-4 above, may assign particular monitoring resources (e.g., particular servers or nodes) for processing, handling, or otherwise storing reported events for the peripheral device.

As indicated at 620, operations at a peripheral device connected to a host system via a host interface may be monitored. Operations may include various communications between the peripheral device and the host system via the host interface. In some embodiments, monitoring the operations may include monitoring the communications between the host system and the peripheral device. Such monitoring may be based on the reporting events, such as various errors, which may be detectable based on the communications over the host system interface. For example, in packet-based bus interfaces (e.g., PCIe), various packet communication errors may be monitored for, such as transaction layer errors, data link errors or physical errors. In some embodiments, a reporting component, such as discussed above in FIG. 4, may evaluate the operations for different events, such as different error conditions, than those available via the host system interface. For example, may monitor error counts and other health information that is not derivable from the system host interface.

A reporting event may be detected based on the monitoring, as indicated at 630, in some embodiments. Reporting events may be errors or other information that indicate the state, health, or operation of the peripheral device. In some embodiments, reporting events may include events defined or detectable as a result of the host system interface, or may include different error conditions or information as noted above. In some embodiments, detecting a reporting event may include classifying (e.g., identifying whether the error is correctable, uncorrectable, or fatal) of the error. In some embodiments an initial analysis or evaluation of the reporting event may be performed to determine whether or not the event should be reported. For instance, some events detected for a first or other number of times beneath some threshold, may not be significant in isolation and thus may not be reported, as discussed below at 640 or 650.

Once detected a notification of the reporting event may be generated, as indicated at 640. For example, a network packet formatted according to a networking protocol (e.g., user datagram protocol (UDP)) may be created and include in the payload of the network packet an indication or notification of the reporting event. For example, different reporting events may be encoded in different formats in order to indicate the different types of reporting events. Some formats may match the formats of those reporting events which may be detected based on communications between a peripheral device and a host system via a host interface, while other indications or notifications of reporting events may be generated according to a customized format. Notifications may include various metadata, such as a timestamp, that identifies when the reporting event was detected.

As indicated at 650, a notification of the reporting event may be sent via a network connection from the peripheral device to the reporting endpoint for a remote data store. The remote data store may be tracking and/or analysis service, such as health monitoring service 240 discussed above with regard to FIGS. 2-4, or may be a simple data store that maintains a log of events as they are received or according to a time stamp or other metadata included in the notification.

Figure 7:
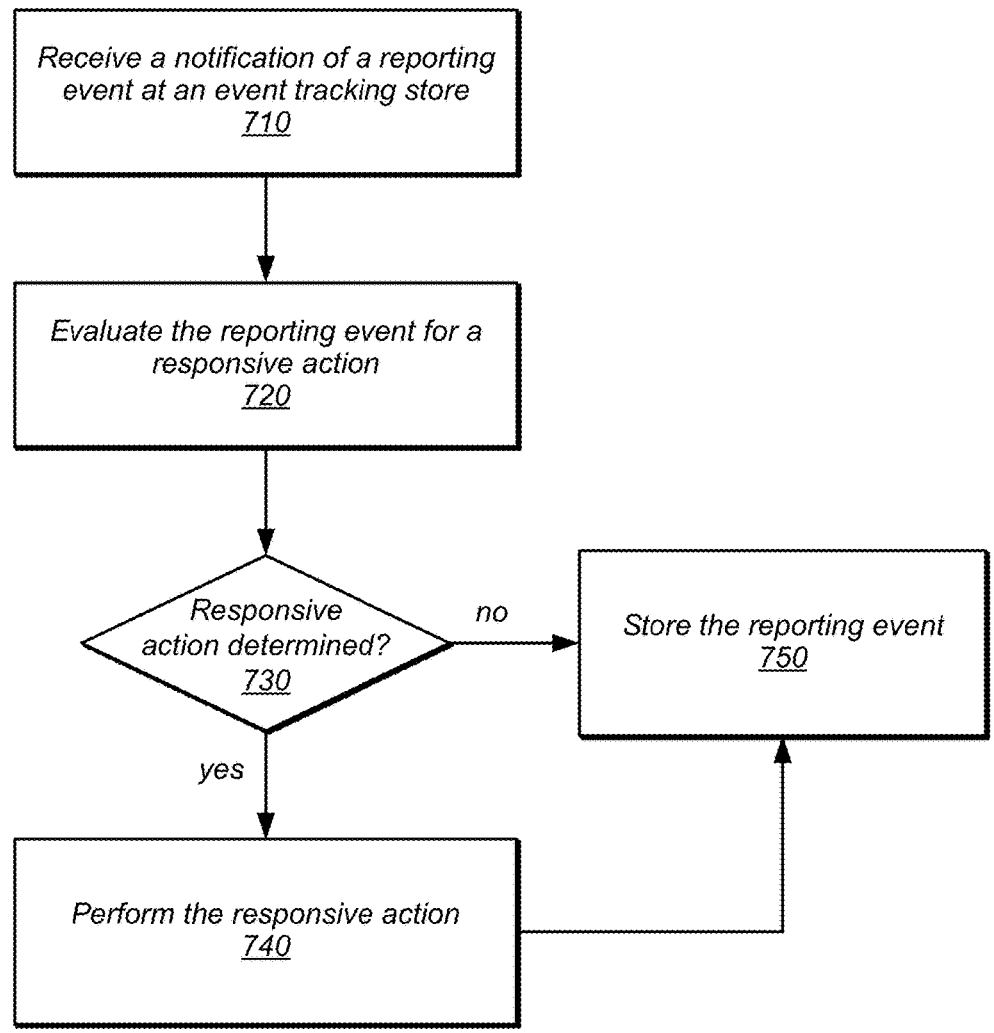
FIG. 7 is a high-level flowchart illustrating various methods and techniques for processing reporting events received at an event tracking store, according to some embodiments.

A remote event tracking store may be configured to store, recording events as they are received or according to a timestamp or other organizational scheme, such as may be implemented by a log-based store. In some embodiments, a remote event tracking store may be configured to process and extract information from reported event notifications (e.g., decode notifications) or perform other operations to reformat the reported events. Reported events may be or other data store for maintaining reporting events for subsequent analysis. In some embodiments, the remote event tracking store, such as health monitoring service 240 discussed above with regard to FIGS. 2-4, may perform various kinds of analysis based on the reported events and initiate responsive actions to cure or ameliorate different error conditions or scenarios. FIG. 7 is a high-level flowchart illustrating various methods and techniques for processing reporting events received at an event tracking store, according to some embodiments.

As indicated at 710, a notification of a reporting event may be received at an event tracking store, in some embodiments. In some embodiments, the notification may be formatted according to an API or other programmatic interface for interaction with the event tracking store. As discussed above, the notification may be included in one or more network packets which may include various information about the event, such as an event identifier, classification, timestamp, and any other metadata or descriptive information of the reporting event.

Based on the reporting event included in the notification, as indicated 720, the reporting event may be evaluated for a responsive action. For example, an event tracking store may maintain various rule sets or analyses (e.g., machine learning or other statistical analysis) that recognize certain events and conditions and the appropriate corresponding responsive action. If, for instance, a rate of failure events reported for a particular peripheral device is above a pre-defined threshold, then a responsive action to halt operation of the host system connected to the peripheral device may be initiated (e.g., by sending request directly to the host system or to a control plane or other system that manages the host system instructing the halt) in order to allow for further analysis of the host system and/or peripheral device. If a responsive action is determined for the reporting event, as indicated by the positive exit from 730, then the responsive action may be performed, as indicated at 740. If not, as indicated by the negative exit from 730 (or after the performing the responsive action), then the reporting event may be stored for subsequent analysis.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may be configured to implement the functionality described herein (e.g., the functionality of various servers, resource hosts, control planes, managers and/or other components, such as those that implement the block-based storage service described herein). The various methods as illustrated in the figures and described herein represent example embodiments of methods. The order of any method may be changed, and various elements may be added, reordered, combined, omitted, modified, etc.

Embodiments of a remote event tracking data store or a host system may be executed on one or more computer systems, which may interact with various other devices. FIG. 8 is a block diagram illustrating an example computer system, according to various embodiments. For example, computer system 1000 may be configured to implement storage and/or compute nodes of a compute cluster, a data stores, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.).

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, block-based storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may host a storage system server node, and persistent storage 1060 may include the SSDs attached to that server node.

Computer system 1000 includes one or more system memories 1020 that are configured to store instructions and data accessible by processor(s) 1010. In various embodiments, system memories 1020 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1020 may contain program instructions 1025 that are executable by processor(s) 1010 to implement the methods and techniques described herein. In various embodiments, program instructions 1025 may be encoded in platform native binary, any interpreted language such as Java™ byte-code, or in any other language such as C/C++, Java™, etc., or in any combination thereof. For example, in the illustrated embodiment, program instructions 1025 include program instructions executable to implement the functionality of a resource host, in different embodiments. In some embodiments, program instructions 1025 may implement multiple separate clients, nodes, and/or other components.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

In some embodiments, system memory 1020 may include data store 1045, which may be configured as described herein. In general, system memory 1020 (e.g., data store 1045 within system memory 1020), persistent storage 1060, and/or remote storage 1070 may store data blocks, replicas of data blocks, metadata associated with data blocks and/or their state, configuration information, and/or any other information usable in implementing the methods and techniques described herein.

In one embodiment, I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard (e.g., PCIe) or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems 1090, for example. In addition, network interface 1040 may be configured to allow communication between computer system 1000 and various I/O devices 1050 and/or remote storage 1070. Input/output devices 1050 may, in some embodiments, include one or more display terminals, keyboards, keypads, touchpads, scanning devices, voice or optical recognition devices, or any other devices suitable for entering or retrieving data by one or more computer systems 1000. Multiple input/output devices 1050 may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1040. Network interface 1040 may commonly support one or more wireless networking protocols (e.g., Wi-Fi/IEEE 802.11, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol. In various embodiments, computer system 1000 may include more, fewer, or different components than those illustrated in FIG. 9 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing and/or storage services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a host system, comprising a processor and a memory;
a peripheral device connected to the host system via a host interface, wherein the peripheral device comprises a networking interface;
wherein the peripheral device is configured to:
monitor for errors at the peripheral device;
upon detection of one or more of the errors at the peripheral device:
generate a network packet that reports the one or more errors; and
transmit the network packet that reports the one or more errors via the networking interface to an event tracking store remote from the host system.

2. The system of claim 1, wherein the one or more detected errors is different from possible errors that are reported from the peripheral device to the host system via the host interface.

3. The system of claim 1, wherein the host interface is a Peripheral Component Interconnect Express (PCIe) interface, and wherein the detected error is a PCIe error.

4. The system of claim 1, wherein the host system is one of a plurality of host systems that host computing resources as part of a provider network and wherein the peripheral device is configured to process network packets received for a computing resource hosted at the host system.

5. A method, comprising:
detecting a reporting event at a peripheral device connected to a host system via a host interface;
in response to detecting the reporting event:
generating, by the peripheral device, a notification of the reporting event; and
sending, from the peripheral device, the notification via a network connection to a remote data store, wherein sending the notification via the network connection bypasses the host interface.

6. The method of claim 5, further comprising determining, by the peripheral device, a network endpoint for the remote data store.

7. The method of claim 5, further comprising sending, by the peripheral device, an indication of the reporting event to the host system via the host interface.

8. The method of claim 5, wherein generating the notification of the reporting event comprises including an indication of another reporting event detected at the peripheral device in the notification.

9. The method of claim 5, wherein the peripheral device is one of a plurality of different peripheral devices connected to respective host systems via host interfaces, wherein the plurality of different peripheral devices perform the detecting the reporting event, generating the notification of the reporting event, and the sending of the reporting event to the remote data store.

10. The method of claim 5, further comprising:
receiving, at the remote data store, the notification of the reporting event; and
storing, at the remote data store, the reporting event.

11. The method of claim 5, wherein the peripheral device is a peripheral device that processes network packets directed to and from a virtual computing resource hosted at the host system.

12. The method of claim 10, further comprising:
receiving, at the remote data store, a request for reporting events stored for the peripheral device from a client; and
sending, from the remote data store, stored reporting events for the peripheral device including the reporting event to the client.

13. The method of claim 12, wherein the remote data store is a health monitoring service that monitors the host system, and wherein the method further comprises:
evaluating, at the health monitoring service, the reporting event to determine a responsive action to be performed with respect to the host system; and
performing, by the health monitoring service, the responsive action determined for the host system.

14. A peripheral device that communicates with a host system via a host interface, wherein the peripheral device is configured to:
   monitor operations of the peripheral device for a reporting event;
   upon detection of a reporting event,
      generate a notification that includes the reporting event; and
      send the notification to a remote event tracking store via a different connection than the host interface.

15. The peripheral device of claim 14, wherein the host interface specifies a plurality of possible reporting events, and wherein the detected reporting event is different from the specified plurality of possible reporting events.

16. The peripheral device of claim 14, wherein the peripheral device comprises a host interface bus to implement communication from the peripheral device to the host system via the host interface, a processor, and a memory that stores program instructions configured to cause the processor to perform the monitoring of operations, the detection of the reporting event, the generation of the notification, and the sending of the notification.

17. The peripheral device of claim 14, wherein to send the notification, the peripheral device is configured to access a programmatically defined network endpoint for the remote event tracking store.

18. The peripheral device of claim 14, further configured to send the reporting event to the host system via the host interface.

19. The peripheral device of claim 14, wherein the host interface failed prior to the detection of the reporting event.

20. The peripheral device of claim 14, wherein the host system is one of a plurality of host systems that host virtual compute instances as part of a provider network and wherein the peripheral device is configured to process network packets received for a virtual compute instance hosted at the host system, and wherein the virtual compute instance is unaware of the performance of the detection, the generation, and the send at the peripheral device.

21. The peripheral device of claim 20, further configured to:
   receive an update describing a different reporting event to monitor for at the peripheral device; and
   monitor operations of the peripheral device for the different reporting event such that the virtual compute instance is unaware of the receipt and the monitoring for the different reporting event.

* * * * *